(12) United States Patent
Muraro

(10) Patent No.: US 7,243,756 B2
(45) Date of Patent: Jul. 17, 2007

(54) EARTH MOVING MACHINE

(75) Inventor: Umberto Muraro, Vicentina (IT)

(73) Assignee: Komatsu Utility Europe S.p.A., Noventa Vicentina (IT)

( * ) Notice: Subject to any disclaimer, the term of this patent is extended or adjusted under 35 U.S.C. 154(b) by 303 days.

(21) Appl. No.: 10/958,295

(22) Filed: Oct. 6, 2004

(65) Prior Publication Data

US 2006/0037805 A1 Feb. 23, 2006

(30) Foreign Application Priority Data

Aug. 19, 2004 (EP) ................................ 04425634

(51) Int. Cl.
*B62D 1/22* (2006.01)
(52) U.S. Cl. ....................... 180/326; 180/321
(58) Field of Classification Search ................ 180/326, 180/315, 334, 338, 321, 271, 272, 330, 331
See application file for complete search history.

(56) References Cited

U.S. PATENT DOCUMENTS

| | | | | |
|---|---|---|---|---|
| 4,699,561 A | * | 10/1987 | Tee | 414/699 |
| 5,409,079 A | * | 4/1995 | Strong et al. | 180/326 |
| 5,835,291 A | * | 11/1998 | Takayama | 359/843 |
| 5,890,764 A | * | 4/1999 | Lee | 297/344.22 |
| 6,226,902 B1 | * | 5/2001 | Heyne | 37/348 |
| 6,564,896 B1 | | 5/2003 | Proksch et al. | |
| 6,643,577 B1 | * | 11/2003 | Padgett et al. | 701/50 |
| 7,036,250 B2 | * | 5/2006 | Dressler et al. | 37/466 |
| 2005/0034913 A1 | * | 2/2005 | Dahl et al. | 180/272 |
| 2006/0113141 A1 | * | 6/2006 | Ackermann | 180/326 |

* cited by examiner

*Primary Examiner*—Paul N. Dickson
*Assistant Examiner*—Joseph Rocca
(74) *Attorney, Agent, or Firm*—Browdy and Neimark PLLC

(57) ABSTRACT

An earth moving machine comprises a vehicle (2), a working device (10) mounted on the rear part (4) of the vehicle (2), a seat (14) rotatably attached to the vehicle (2) and able to rotate between a front position in which it is facing the front part (3) of the vehicle (2) and a rear position in which it is facing the rear part (4) of the vehicle (2), driving means (15) for the vehicle (2), and means (19) for moving the working device (10). The machine (1) also comprises a sensor (22) attached to the seat (14) to detect its position and enabling means operatively connected to the sensor (22) and to the movement means (19) for enabling operation of the movement means (19) at least when the seat (14) is in the front and rear positions, and for inhibiting operation of the movement means when the seat (14) is in at least one intermediate position between the front and rear positions, thus there being detected, during rotation of the seat (14), at least a front enabling zone (23) and a rear enabling zone (24) in which the movement means (19) are enabled, and at least one side inhibit zone (25) in which operation of the movement means (19) is inhibited.

18 Claims, 5 Drawing Sheets

EARTH MOVING MACHINE

TECHNICAL FIELD

The present invention relates to an earth moving machine of the type comprising a vehicle with a rear working device.

BACKGROUND OF THE INVENTION

At a manoeuvring position the vehicle has a seat, rotating according to a vertical axis of rotation, which can rotate between a front position in which it is facing the front part of the vehicle and a rear position in which it is facing the rear part of the vehicle.

When the seat is in the front position the vehicle driving means are in front of the operator, whilst when the seat is in the rear position the working device movement means are in front of the operator. Various types of movement means are currently used. A first technology uses mechanical controls consisting of a set of levers.

A second technology, described for example in U.S. Pat. No. 6,564,896, instead uses servo-controls which can be operated by means of a pair of controllers mounted on the top of two vertical tower assemblies pivoting at the base.

When the seat is in the rear position, the two tower assemblies may be rotated relative to the base so as to move the controllers towards or away from the seat.

In both of the types described, the movement means are always active and in all movements allow use of the working device which in most cases is an articulated arm with a bucket at the end.

However, these known technologies have the significant disadvantage of the risk that the rear working device may be operated accidentally, in particular as the operator moves from the front position to the rear position.

When this occurs the arm may swivel and strike any obstacles and/or persons present close to the machine.

Yet it should be considered that the operator must occasionally be able to manoeuvre the arm even when driving the vehicle normally, for example in order to get the machine into narrow spaces.

Another disadvantage of the machines used today is the similar risk of accidentally starting the vehicle when the operator is working with the rear arm.

SUMMARY OF THE INVENTION

In this situation, the technical need which forms the basis of the present invention is to provide an earth moving machine which overcomes the above-mentioned disadvantages.

In particular, the technical need of the present invention is to provide an earth moving machine which allows accidental operation of the rear working device to be avoided.

Another technical need of the present invention is to provide an earth moving machine which also allows accidental operation of the vehicle driving means to be avoided.

The technical need and aims specified are substantially achieved by an earth moving machine as described in the claims herein.

BRIEF DESCRIPTION OF THE DRAWINGS

Other characteristics and advantages of the present invention are more clearly illustrated in the detailed description which follows, with reference to the accompanying drawings, which illustrate several preferred embodiments of an earth moving machine without limiting the scope of the inventive concept, and in which.

DETAILED DESCRIPTION OF THE INVENTION

With reference to the accompanying drawings, the numeral 1 denotes as a whole an earth moving machine made in accordance with the present invention.

Figure 1:
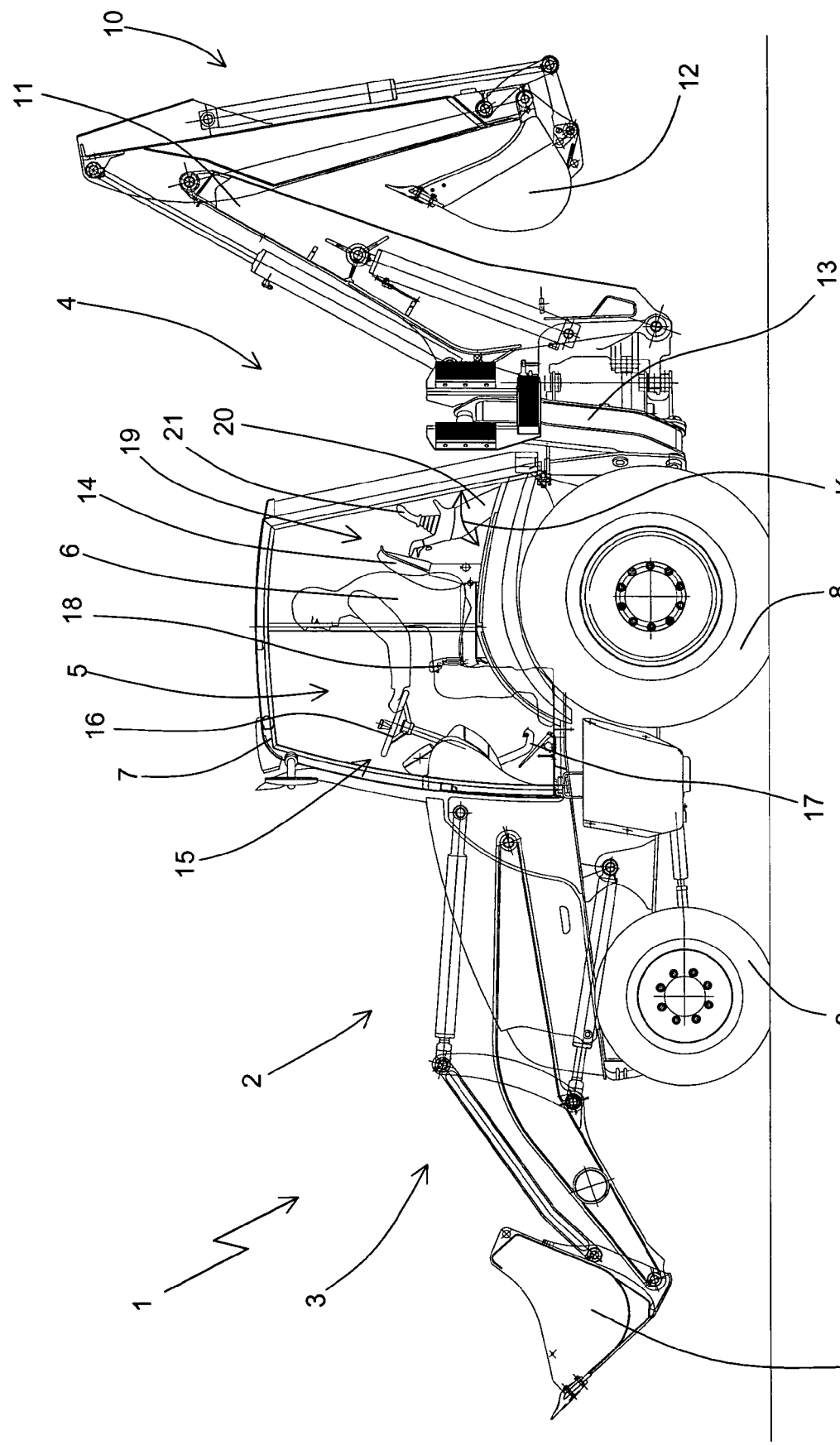
FIG. 1 is a schematic side view, with some parts transparent, of an earth moving machine made in accordance with the present invention.

FIG. 1 illustrates a machine 1 comprising a vehicle 2 with a front part 3 and a rear part 4 and which has a manoeuvring position 5 for an operator 6, surrounded by a cab 7 (in other embodiments there may be a canopy in place of the cab 7).

The vehicle 2 in FIG. 1 also has wheels 8, a front loading shovel 9 and a working device 10 mounted on its rear part 4, and consisting of an articulated arm 11 with a bucket 12.

Two conventional stabilising feet 13 are also attached to the rear part 4 of the vehicle 2.

A seat 14 is rotatably attached to the vehicle 2, according to a vertical axis of rotation, at the manoeuvring position 5.

Said seat 14 can rotate between a front position in which it faces the front part 3 of the vehicle 2 (FIG. 1) and a rear position in which it faces the rear part 4 of the vehicle 2 (not illustrated). Driving means 15 are mounted on the vehicle 2 at a zone in front of the seat 14 when the seat is in the front position.

In the conventional way, the driving means 15 comprise a steering wheel 16 and pedals 17.

There are also two control handles 18 attached to the seat 14, for operating the front loading shovel 9.

The vehicle 2 is fitted with means 19 for moving the working device 10 at a zone in front of or at the side of the seat 14, when the seat is in the rear position.

The movement means 19 may take any form without thereby departing from the scope of the inventive concept. In FIG. 1 the movement means 19 are similar to those described in U.S. Pat. No. 6,564,896, which should be referred to for further details relative to the movement means 19.

Briefly, said movement means 19 comprise a pair of tower assemblies 20 extending mainly vertically, located on either side of the seat 14 (when the seat is in the rear position). In any event, according to the applications, there may also be only one tower assembly 20.

Each tower assembly 20 has, at its upper end, a controller 21 for operating various working device 10 functions.

Each tower assembly 20 is pivotally connected to the vehicle 2 close to its lower end and is mobile (see arrow K in FIG. 1) between an operating position (FIG. 1) in which it is close to the seat 14 and a seat 14 free rotation position in which the tower assembly is distanced from the seat 14 (not illustrated).

The controllers 21 operate irrespective of the position of the tower assemblies 20.

According to the present invention, the earth moving machine 1 comprises a sensor 22 attached to the seat 14 to detect the position of the seat and enabling means (not illustrated) operatively connected to the sensor 22 and to the movement means 19 to enable operation of the movement means 19 at least when the seat 14 is in the front and rear positions, and to inhibit their operation when the seat 14 is in at least one intermediate position between the front and rear positions.

In this way, during rotation of the seat 14, at least a front enabling zone 23 and a rear enabling zone 24 are detected, in which the movement means 19 are enabled for operation, and at least one side inhibit zone 25 in which operation of the movement means 19 is inhibited.

Whether or not the controllers 21 (or any other movement means) operate therefore depends on the position of the seat 14 but not on the position of the relative tower assemblies 20.

Advantageously, the front enabling zone 23 corresponds to seat 14 positioning within a first predetermined angle 26 of rotation starting from the front position.

Depending on the embodiments, the first angle 26 may be the same whatever the direction of rotation of the seat 14 relative to the front position, or it may vary with variations in the direction of rotation of the seat 14 relative to the front position (that is to say, if the user turns the seat 14 to the right or to the left).

The first angle 26 is preferably less than 45° in both directions of rotation, so that the front enabling zone 23 corresponds to an angle of rotation of less than 90° (for example, approximately 60°).

Similarly, the rear enabling zone 24 corresponds to seat 14 positioning within a second predetermined angle 27 of rotation starting from the rear position.

Again, depending on the embodiments, the second angle 27 may be the same whatever the direction of rotation of the seat 14 relative to the rear position, or it may vary with variations in the direction of rotation of the seat 14 relative to the rear position (that is to say, if the user turns the seat 14 to the right or to the left).

The second angle 27 is also preferably less than 45° in both directions of rotation, so that the rear enabling zone 24 corresponds to an angle of rotation of less than 90° (for example, approximately 60°).

FIGS. 2 to 7 illustrate two embodiments of the sensor 22. For greater simplicity only the manoeuvring position 5 with the rotary base 28 of the seat 14 and the sensor 22 are illustrated. However, there are also other embodiments with other types of sensors, for example electromagnetic.

Figure 2:
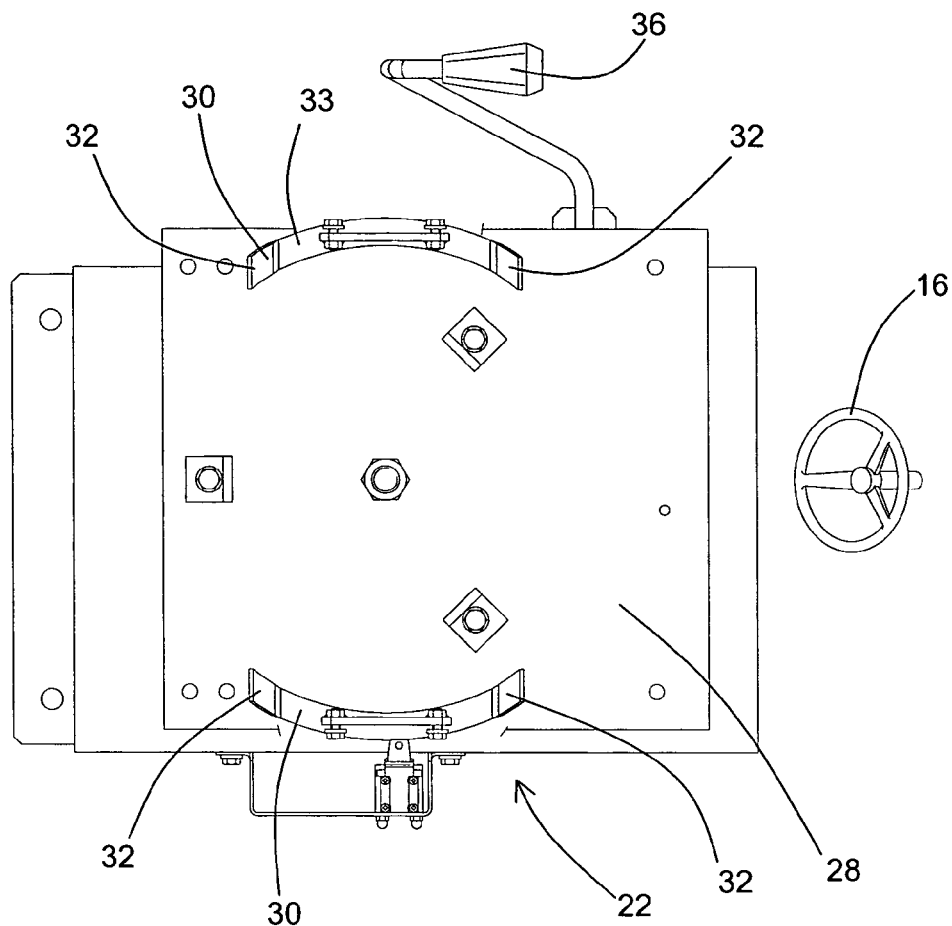
FIG. 2 is a schematic top view of some details of the machine illustrated in FIG. 1.
Figure 3:
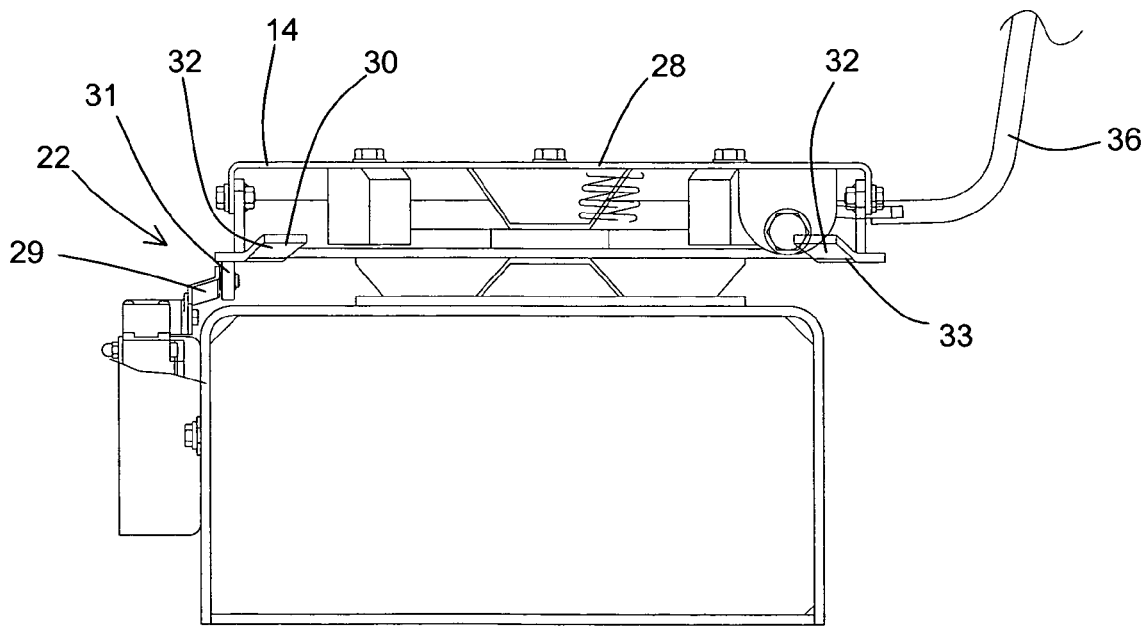
FIG. 3 is a front view with some parts cut away, of a portion of the detail illustrated in FIG. 2.
Figure 4:
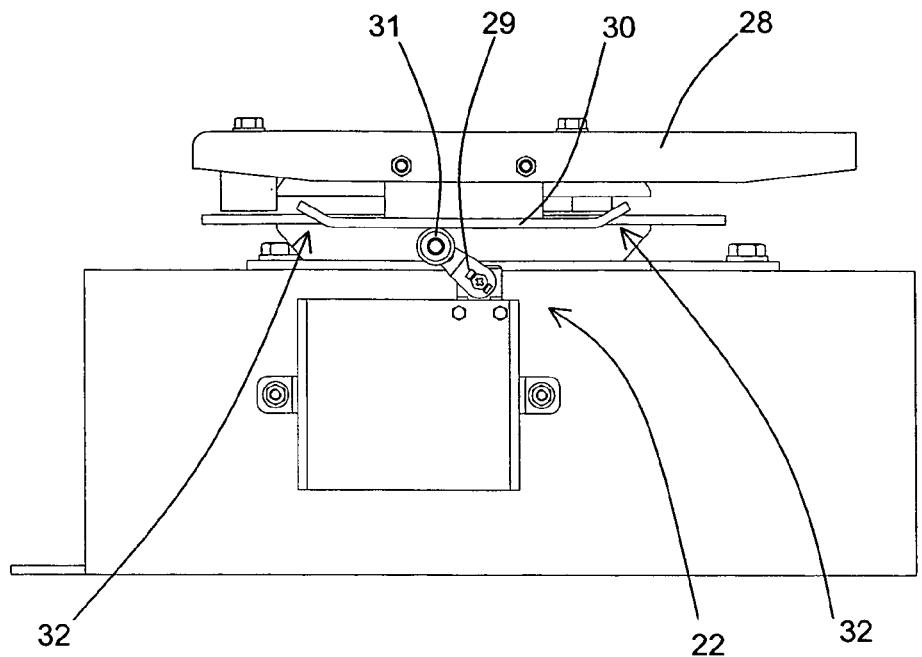
FIG. 4 is a side view, with some parts cut away, of the portion illustrated in FIG. 3.

According to the embodiment illustrated in FIGS. 2 to 4, the sensor 22 comprises a first detector rod 29 pivotally connected to the vehicle 2 and at least a first slide 30 fixed to the seat 14.

As illustrated in particular in FIG. 4, the rod is pivotally connected to the vehicle 2 at its base according to a horizontal axis of rotation, is fitted with a first idle engagement roller 31 at its upper end, and centring means (not illustrated) designed to hold it substantially vertical in the absence of external stresses.

The first slide 30 consists of a curved flange which is mainly flat, whose ends each have an angled guide 32 for interaction with the first idle roller 31.

The first slide 30 causes the first rod 29 to rotate when the seat 14 is in the enabling zones 23, 24 (in other embodiments, the first slide 30 may cause the first rod 29 to rotate when the seat 14 is outside the enabling zones 23, 24).

As shown, when the seat 14 is in the front position, the first rod 29 is not at the centre of the first slide 30. As a result, in this case, the first angle 26 is different according to the direction of rotation of the seat 14.

To allow operation of the movement means 19 both when the seat 14 is in the front position and when it is in the rear position, the sensor 22 also comprises a second slide 33, attached to the seat 14 in a position diametrically opposed to the first slide 30 with reference to the axis of rotation of the seat 14.

Alternatively, there may be another rod in a position diametrically opposed to the first rod 29, again with reference to the axis of rotation of the seat 14.

Figure 5:
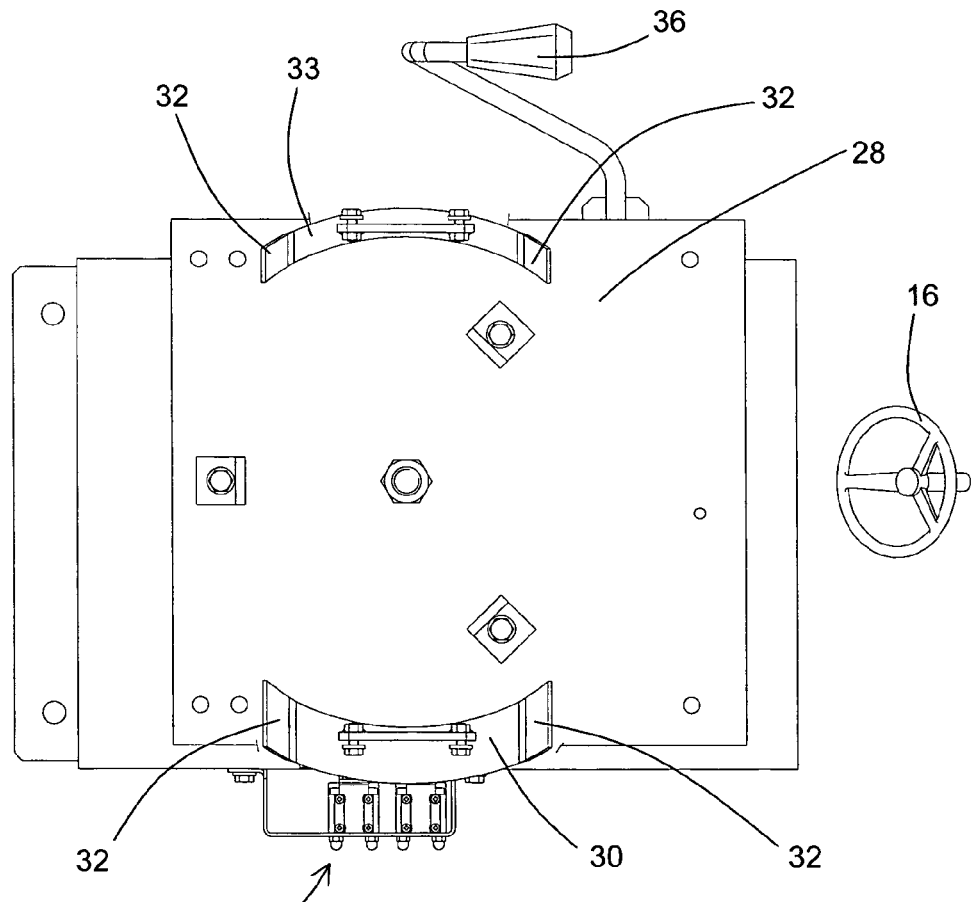
FIG. 5 is a schematic top view of an alternative embodiment of the detail illustrated in FIG. 2.
Figure 6:
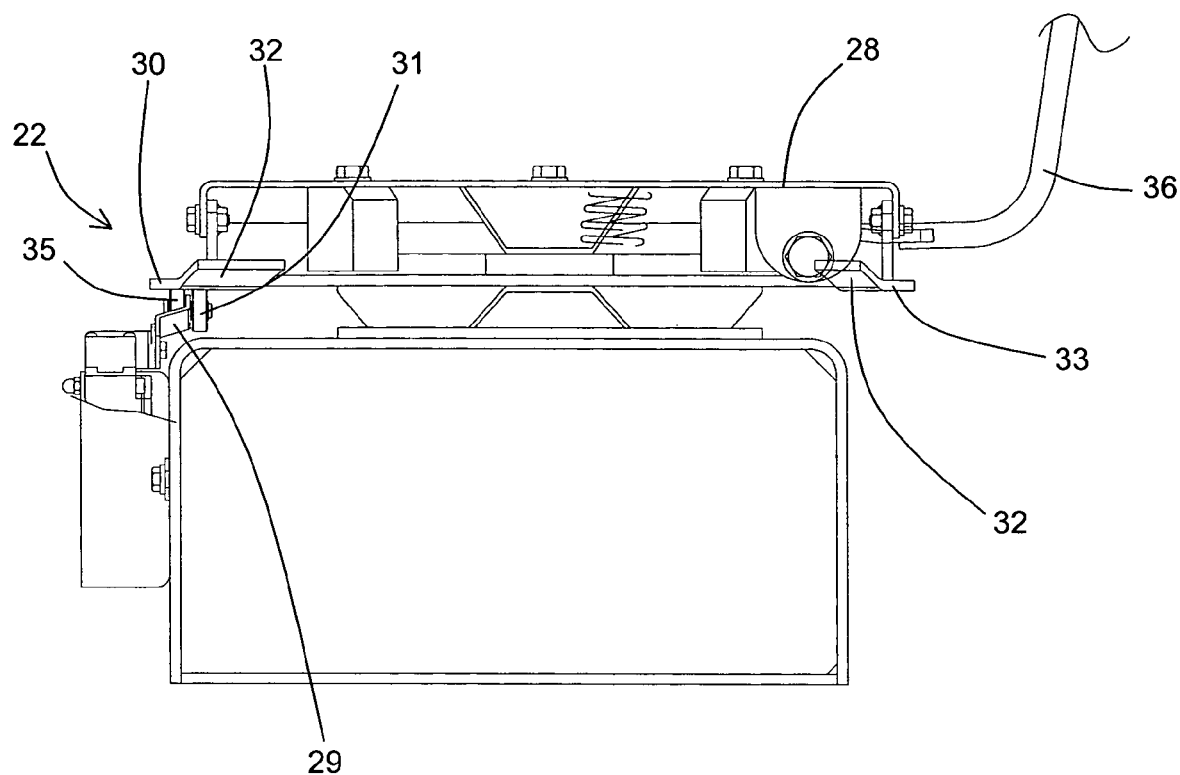
FIG. 6 is a front view, with some parts cut away, of a portion of the detail illustrated in FIG. 5.
Figure 7:
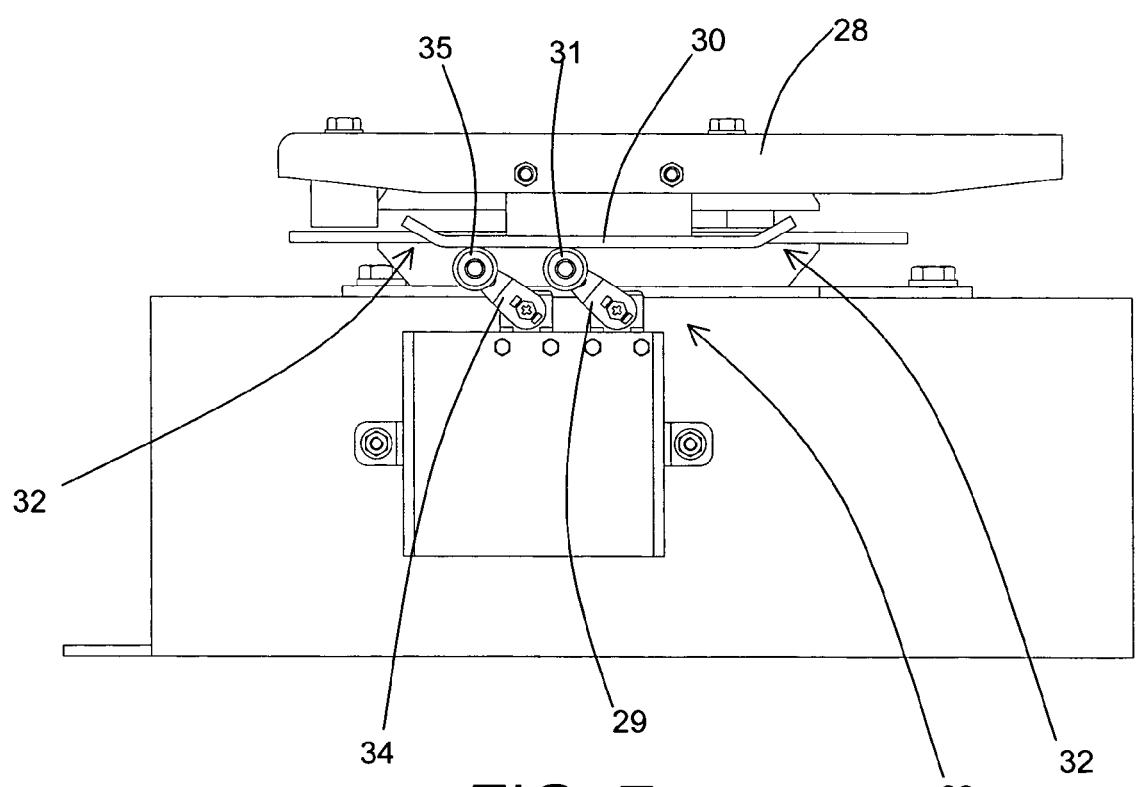
FIG. 7 is a side view, with some parts cut away, of the portion illustrated in FIG. 6.
Figure 8:
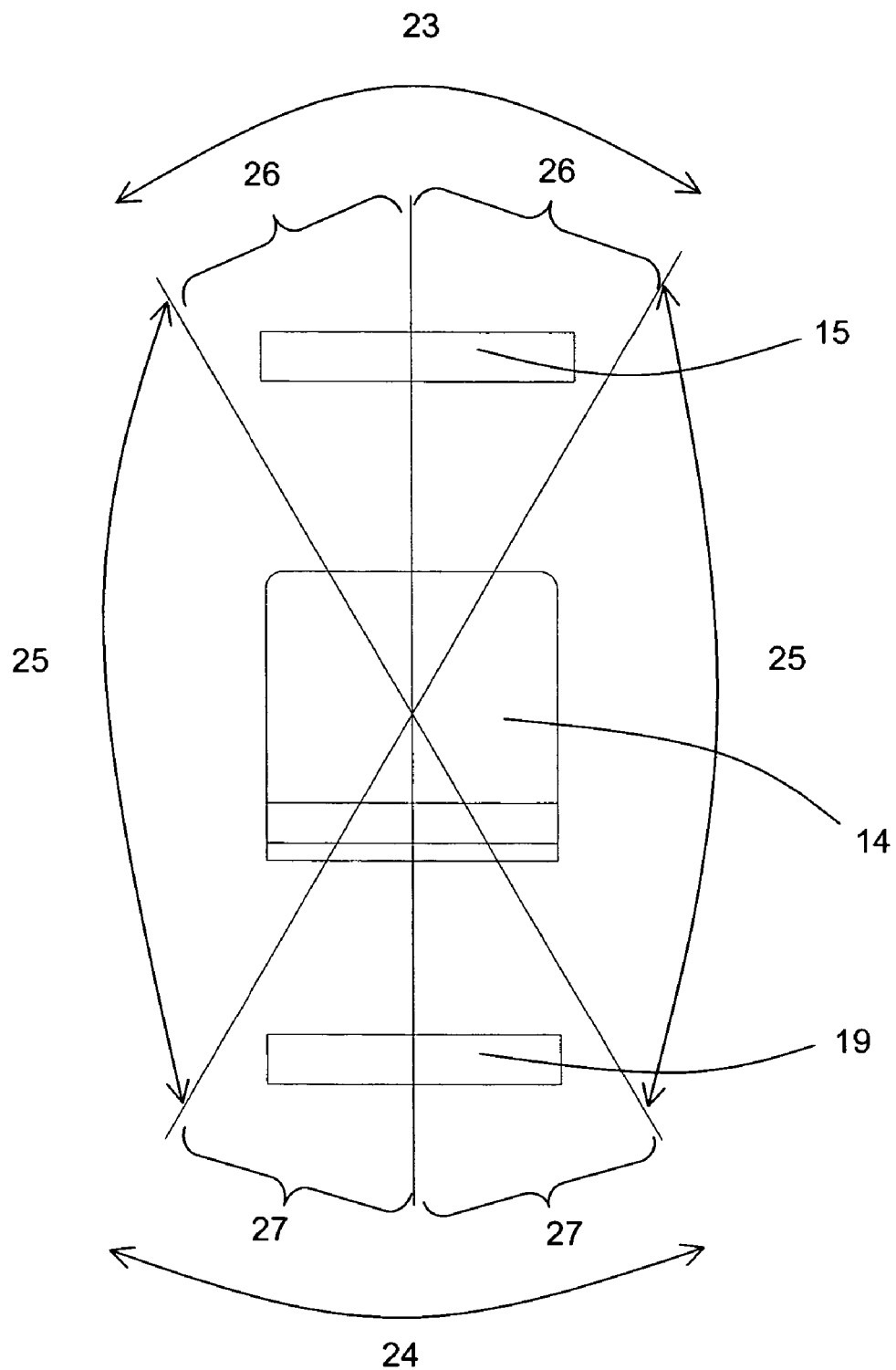
FIG. 8 is a schematic illustration of the positions which can be assumed by the seat of the earth moving machine made in accordance with the present invention.

In the embodiment illustrated in FIGS. 5 to 7, the earth moving machine 1 also comprises a detector device (not illustrated) attached to the driving means 15 for detecting when an operator 6 attempts to operate them, as well as an acoustic alarm (also not illustrated) operatively connected to the detector device and to the sensor 22.

In one embodiment the detector device detects attempts to engage a vehicle 2 forward gear or reverse gear.

The acoustic alarm is set up in such a way that it issues an alarm signal when, simultaneously, the seat 14 is outside the front enabling zone 23 and the detector detects an attempt to operate the driving means 15.

In this case, the sensor 22 also comprises a second detector rod 34 pivotally connected to the vehicle 2, also having a second idle roller 35 at its upper end (FIG. 7), and with centring means (not illustrated) designed to hold it substantially vertical in the absence of external stresses.

The second rod 34 is alongside the first rod 29, and as illustrated in FIG. 6 is positioned at a different distance from the axis of rotation of the seat 14, relative to the first rod 29.

Moreover, only one of the two slides 30, 33 is sized in such a way as to strike not only the first idle roller 31, but also the second idle roller 35 (in particular, one of the two slides 30, 33, the first 30 in the accompanying drawings, is wider), thus acting on the relative rod 29, 34.

Again, according to requirements, one of the slides 30, 33 may cause the second rod 34 to rotate when the seat 14 is in the front enabling zone 23, or outside said zone.

In the conventional way, the seat 14 may be fitted with selective locking means 36 (of which, in the accompanying drawings, only the operating lever is visible) for controlling the enabling and inhibiting of seat 14 rotation.

Operation of the present invention is directly derived from what is described above.

In particular, each rod 29, 34 of the sensor 22 is electrically connected to the enabling means, which it supplies with a different signal depending on whether it is in a vertical position or tilted as illustrated in FIG. 4. Each rod 29, 34 therefore has a minimum angle of inclination beyond which signal switching takes place.

In the embodiments illustrated, when the seat 14 is in the front and rear positions, or close to them (that is to say, within the enabling zones 23, 24), one of the two slides 30, 33 acts on the first rod 29 (or even on the second rod 34) holding it in the tilted position.

The signal issued by the sensor 22 then reaches the enabling means, which keep the working device 10 movement means 19 enabled.

When the operator 6 rotates the seat 14, at the moment when the rod 29, 34 disengages from the relative slide 30, 33 the rod returns to the vertical position and transmits a different signal to the enabling means, which disable operation of the movement means 19.

In addition, when the seat 14 is outside the front enabling zone 23 (therefore, it is not facing the front part 3 of the vehicle 2) if the detector detects an attempt to use the driving means 15 (for example, an attempt to engage a gear) it indicates this to the acoustic alarm, which issues an alarm signal (preferably continuous) to warn the operator 6 that this is a risky manoeuvre.

In the preferred embodiment the front and rear enabling zones 23, 24 extend over an angle of approximately 60°, whilst the side inhibit zones 25 extend over an angle of approximately 120°.

According to the dimensions of the earth moving machine 1 and of the manoeuvring position 5, the seat 14 may be able either to rotate freely about its own axis through an angle of 360°, or to rotate only between two end positions through a total angle of less than 360°.

The latter situation occurs, for example, when the seat 14, starting from the front position, may be brought to the rear position (and vice versa) by rotating in a single direction. In this case there may be a single inhibit zone 25.

The present invention brings important advantages. Firstly, thanks to the enabling means and the sensor operating in conjunction with one another, the rear working device cannot be accidentally operated, especially during rotation of the seat from the front position to the rear position.

However, at the same time while driving the machine the operator can operate the working device to make small adjustments to it, for example so as to get through narrow passageways. Such an operation is facilitated by the possibility of partially rotating the seat backwards.

In the second embodiment, the earth moving machine made in accordance with the present invention also allows accidental operation of the vehicle driving means to be prevented, since if an operator attempts to operate the driving means when the seat is not in the front enabling zone, an alarm signal is issued which warns the operator that he/she is attempting a risky operation.

It should also be noticed that the present invention is relatively easy to produce and even the cost linked to implementation of the invention is not very high.

The invention described may be subject to modifications and variations without thereby departing from the scope of the inventive concept. All details may be substituted with other, technically equivalent elements and in practice all of the materials used, as well as the shapes and dimensions of the various components, may be any according to requirements.

What is claimed is:

1. An earth moving machine comprising
 a vehicle (2) with a front part (3) and a rear part (4) and with a maneuvering position (5) for an operator (6);
 a working device (10) mounted on the rear part (4) of the vehicle (2);
 a seat (14) rotatably attached to the vehicle (2) according to a vertical axis of rotation at the maneuvering position (5) and being able to rotate between a front position in which it is facing the front part (3) of the vehicle (2) and a rear position in which it is facing the rear part (4) of the vehicle (2);
 vehicle (2) driving means (15) attached to the vehicle (2) at a zone in front of the seat (14) when the seat is in the front position;
 working device (10) movement means (19) attached to the vehicle (2) at a zone in front of the seat (14) when the seat is in the rear position;
 wherein the earth moving machine comprises a sensor (22) connected to the machine to detect a position of the seat and enabling means operatively connected to the sensor (22) and to the movement means (19), for enabling operation of the movement means (19) at least when the seat (14) is in the front and rear positions, and for inhibiting operation of the movement means when the seat (14) is in at least one intermediate position between the front and rear positions, so that, during seat (14) rotation, at least a front enabling zone (23) and a rear enabling zone (24) are detected, in which the movement means (19) are enabled, and at least one side inhibit zone (25) in which operation of the movement means (19) is inhibited.

2. The earth moving machine according to claim 1, wherein the front enabling zone (23) corresponds to seat (14) positioning within a first predetermined angle (26) of rotation starting from the front position.

3. The earth moving machine according to claim 2, wherein the first angle (26) is the same whatever the direction of rotation of the seat (14) relative to the front position.

4. The earth moving machine according to claim 2, wherein the first angle (26) varies with variations in the direction of rotation of the seat (14) relative to the front position.

5. The earth moving machine according to claim 2, wherein the first angle (26) is less than 45°.

6. The earth moving machine according to claim 1, wherein the rear enabling zone (24) corresponds to seat (14) positioning within a second predetermined angle (27) of rotation starting from the rear position.

7. The earth moving machine according to claim 6, wherein the second angle (27) is the same whatever the direction of rotation of the seat (14) relative to the rear position.

8. The earth moving machine according to claim 6, wherein the second angle (27) varies with variations in the direction of rotation of the seat (14) relative to the rear position.

9. The earth moving machine according to claim 6, wherein the second angle (27) is less than 45°.

10. An earth moving machine comprising
 a vehicle (2) with a front part (3) and a rear part (4) and with a maneuvering position (5) for an operator (6);
 a working device (10) mounted on the rear part (4) of the vehicle (2);
 a seat (14) rotatably attached to the vehicle (2) according to a vertical axis of rotation at the maneuvering position (5) and being able to rotate between a front position in which it is facing the front part (3) of the vehicle (2) and a rear position in which it is facing the rear part (4) of the vehicle (2);
 vehicle (2) driving means (15) attached to the vehicle (2) at a zone in front of the seat (14) when the seat is in the front position;
 working device (10) movement means (19) attached to the vehicle (2) at a zone in front of the seat (14) when the seat is in the rear position;
 wherein the earth moving machine comprises a sensor (22) to detect a position of the seat and enabling means operatively connected to the sensor (22) and to the movement means (19), for enabling operation of the movement means (19) at least when the seat (14) is in the front and rear positions, and for inhibiting operation of the movement means when the seat (14) is in at least one intermediate position between the front and rear positions, so that, during seat (14) rotation, at least a front enabling zone (23) and a rear enabling zone (24) are detected, in which the movement means (19) are enabled, and at least one side inhibit zone (25) in which operation of the movement means (19) is inhibited;

wherein the sensor (22) comprises a first detector rod (29) pivotally connected to the vehicle (2) and at least a first slide (30) fixed to the seat (14)

the first slide (30) causing the first rod (29) to rotate when the seat (14) is in the enabling zones (23), (24), or when the seat is outside the enabling zones (23, 24).

11. The earth moving machine according to claim 10, wherein the sensor (22) also comprises a second slide (33), attached to the seat (14) in a position diametrically opposite the first slide (30) with reference to the axis of rotation of the seat (14).

12. The earth moving machine according to claim 10, wherein the sensor (22) also comprises a second slide (33), attached to the seat (14) in a position diametrically opposite the first slide (30) with reference to the axis of rotation of the seat (14).

13. The earth moving machine according to claim 1, wherein it also comprises a detector device attached to the driving means (15) for detecting when an operator (6) attempts to operate the driving means (15), and an acoustic alarm operatively connected to the detector device and to the sensor (22), for issuing an alarm signal when, simultaneously, the seat (14) is outside the front enabling zone (23) and the detector detects an attempt to operate the driving means (15).

14. The earth moving machine according to claim 1, wherein the sensor (22) comprises a first detector rod (29) pivotally connected to the vehicle (2) and at least a first slide (30) fixed to the seat (14), the first slide (30) causing the first rod (29) to rotate when the seat (14) is outside the enabling zones (23), (24), the sensor (22) also comprising a second slide (33), attached to the seat (14) in a position diametrically opposite the first slide (30) with reference to the axis of rotation of the seat (14), said machine also comprising a detector device attached to the driving means (15) for detecting when an operator (6) attempts to operate the driving means (15), and an acoustic alarm operatively connected to the detector device and to the sensor (22), for issuing an alarm signal when, simultaneously, the seat (14) is outside the front enabling zone (23) and the detector detects an attempt to operate the driving means (15), the sensor (22) also comprising a second detector rod (34) pivotally connected to the vehicle (2), one of the slides (30), (33) causing the second rod (34) to rotate when the seat (14) is outside the front enabling zone (23).

15. The earth moving machine according to claim 1, wherein the sensor (22) comprises a first detector rod (29) pivotally connected to the vehicle (2) and at least a first slide (30) fixed to the seat (14), the first slide (30) causing the first rod (29) to rotate when the seat (14) is in the enabling zones (23), (24), the sensor (22) also comprising a second slide (33), attached to the seat (14) in a position diametrically opposite the first slide (30) with reference to the axis of rotation of the seat (14), said machine also comprising a detector device attached to the driving means (15) for detecting when an operator (6) attempts to operate the driving means (15), and an acoustic alarm operatively connected to the detector device and to the sensor (22), for issuing an alarm signal when, simultaneously, the seat (14) is outside the front enabling zone (23) and the detector detects an attempt to operate the driving means (15), the sensor (22) also comprising a second detector rod (34) pivotally connected to the vehicle (2), one of the slides (30), (33) causing the second rod (34) to rotate when the seat (14) is in the front enabling zone (23).

16. The earth moving machine according to claim 1, wherein it also comprises selecting locking means (36) for controlling the enabling and inhibiting of seat (14) rotation.

17. The earth moving machine according to claim 1, wherein the movement means (19) comprise one or more tower assemblies (20) extending mainly vertically, each having a controller (21) at its upper end, said tower assemblies (20) pivotally connected to the vehicle (2) close to their lower ends and being mobile between an operating position in which they are close to the seat (14) and a seat (14) free rotation position in which they are distanced from the seat (14), operation of the controllers (21) being independent of the position of the tower assemblies (20) and dependent on the position of the seat (14).

18. An earth moving machine comprising
a vehicle (2) with a front part (3) and a rear part (4) and with a maneuvering position (5) for an operator (6);
a working device (10) mounted on the rear part (4) of the vehicle (2);
a seat (14) rotatably attached to the vehicle (2) according to a vertical axis of rotation at the maneuvering position (5) and being able to rotate between a front position in which it is facing the front part (3) of the vehicle (2) and a rear position in which it is facing the rear part (4) of the vehicle (2);
vehicle (2) driving means (15) attached to the vehicle (2) at a zone in front of the seat (14) when the seat is in the front position;
a working device (10) and movement means (19) attached to the vehicle (2) at a zone in front of the seat (14) when the seat is in the rear position;
wherein the earth moving machine comprises a sensor (22) pivotally connected to the vehicle (2) and movably engaged to the seat to detect a position of the seat when the seat is rotated to rotate the sensor on the vehicle and enabling means operatively connected to the sensor (22) and to the movement means (19), for enabling operation of the movement means (19) at least when the seat (14) is in the front and rear positions, and for inhibiting operation of the movement means when the seat (14) is in at least one intermediate position between the front and rear positions, so that, during seat (14) rotation, at least a front enabling zone (23) and a rear enabling zone (24) are detected, in which the movement means (19) are enabled, and at least one side inhibit zone (25) in which operation of the movement means (19) is inhibited.

* * * * *